US007945090B2

(12) United States Patent
Diggins

(10) Patent No.: US 7,945,090 B2
(45) Date of Patent: May 17, 2011

(54) COLOUR DETECTION

(75) Inventor: Jonathan Diggins, Eastleigh (GB)

(73) Assignee: Snell & Wilcox Limited, Hampshire (GB)

( * ) Notice: Subject to any disclaimer, the term of this patent is extended or adjusted under 35 U.S.C. 154(b) by 1061 days.

(21) Appl. No.: 11/738,188

(22) Filed: Apr. 20, 2007

(65) Prior Publication Data

US 2007/0280558 A1    Dec. 6, 2007

(30) Foreign Application Priority Data

Apr. 21, 2006    (GB) .................................. 0607920.6

(51) Int. Cl.
*G06K 9/00* (2006.01)
(52) U.S. Cl. ........................ 382/162; 382/168
(58) Field of Classification Search .......... 382/162–172, 382/270–274, 260; 358/1.9, 3.21, 515–522; 345/589–604; 348/222.1–223.1
See application file for complete search history.

(56) References Cited

U.S. PATENT DOCUMENTS

| 4,636,845 | A | | 1/1987 | Alkofer |
| 4,642,683 | A | | 2/1987 | Alkofer |
| 4,656,665 | A | | 4/1987 | Pennebaker |
| 5,295,202 | A | | 3/1994 | Steinkirchner et al. |
| 5,608,851 | A | * | 3/1997 | Kobayashi .................... 345/591 |
| 6,377,702 | B1 | * | 4/2002 | Cooper ......................... 382/167 |
| 7,190,844 | B2 | * | 3/2007 | Kobayashi et al. ........... 382/274 |
| 7,292,371 | B2 | * | 11/2007 | Kuwata et al. ................. 358/1.9 |
| 7,466,455 | B2 | * | 12/2008 | Boesten et al. .............. 358/3.21 |
| 7,548,344 | B2 | * | 6/2009 | Matsuya ........................ 358/1.9 |
| 2004/0071362 | A1 | | 4/2004 | Curry et al. |
| 2005/0169524 | A1 | | 8/2005 | Moriya |

FOREIGN PATENT DOCUMENTS

| EP | 0 187 911 | 7/1986 |
| EP | 0 441 358 | 8/1991 |
| EP | 1 265 436 | 12/2002 |
| EP | 1 326 425 | 7/2003 |
| JP | 2005004470 | 1/2005 |

* cited by examiner

*Primary Examiner* — Sherali Ishrat
(74) *Attorney, Agent, or Firm* — Fish & Richardson P.C.

(57) ABSTRACT

Monochrome images are detecting by analysing the skew of the statistical distribution of color difference values of pixels. A skew parameter is derived from an upper percentile, a lower percentile and a median value of the statistical distribution of color difference values and color is detected when the said skew parameter exceeds a threshold.

24 Claims, 2 Drawing Sheets

COLOUR DETECTION

RELATED APPLICATION

This application claims priority to British application GB 0607920.6, filed Apr. 21, 2006, the contents of which are incorporated herein by reference.

BACKGROUND OF THE INVENTION

This invention concerns the analysis of image data to detect monochrome images.

The automatic detection of image characteristics is desirable for many applications including the classification of images in a library and the control and monitoring of broadcasting and similar installations. A useful image characteristic is whether or not it contains a representation of the colours of objects.

Systems which process colour images generally define pixels of the image by three parameters. The two most commonly used parameter sets are: Red Green and Blue; and, Luminance Red colour difference and Blue colour difference. (Usually the colour difference signals are proportional to the difference between the relevant colour component value and the luminance value, other colour difference signals are known.) Conversion between these two systems is possible by linear transformation.

It is known to recognise images lacking colour information by looking for zero, or low, values of the colour difference parameters. However this method is unreliable for images lacking strongly coloured content, such as snow scenes. This method will also not distinguish monochrome images which have been given an overall colour wash (e.g. a sepia tone), from images in which the colour content describes the objects in the image. There are other sources of "spurious" colour information such as the "cross-colour" artefact of composite colour coding systems (PAL, SECAM etc.), and noise from analogue transmission and storage techniques.

SUMMARY OF THE INVENTION

The invention consists of a method and apparatus for detecting representative colour content in an image by analysing the skew of the statistical distribution of colour difference values of pixels derived from the said image.

Suitably, the skew parameter is derived from an upper percentile, a lower percentile and a median value of the statistical distribution of colour difference values of the said pixels and representative colour is detected when the said skew parameter exceeds a threshold.

Advantageously, results from the analysis of more than one colour difference value from each pixel are analysed.

In one embodiment at least two related images are analysed and analysis results from separate images are used to derive a single detection result.

In another embodiment a defined region within an image is analysed.

In another embodiment the distribution of spatially filtered colour difference values of pixels is analysed.

In another embodiment the said analysis includes deriving a histogram of the statistical frequency distribution of colour difference values.

Advantageously, the histogram is smoothed prior to analysis.

In another embodiment the detection result depends upon an average luminance level.

Advantageously a detection result is discarded if an extreme average luminance value is detected.

In another embodiment the detection result is modified if a high proportion of the colour difference values analysed correspond to high colour saturation.

In another embodiment the detection result is modified if a high proportion of widely separated colour difference values occur in the analysed colour difference values.

BRIEF DESCRIPTION OF THE DRAWINGS

An example of the invention will now be described with reference to the drawings in which.

DESCRIPTION OF PREFERRED EMBODIMENTS

Figure 1:
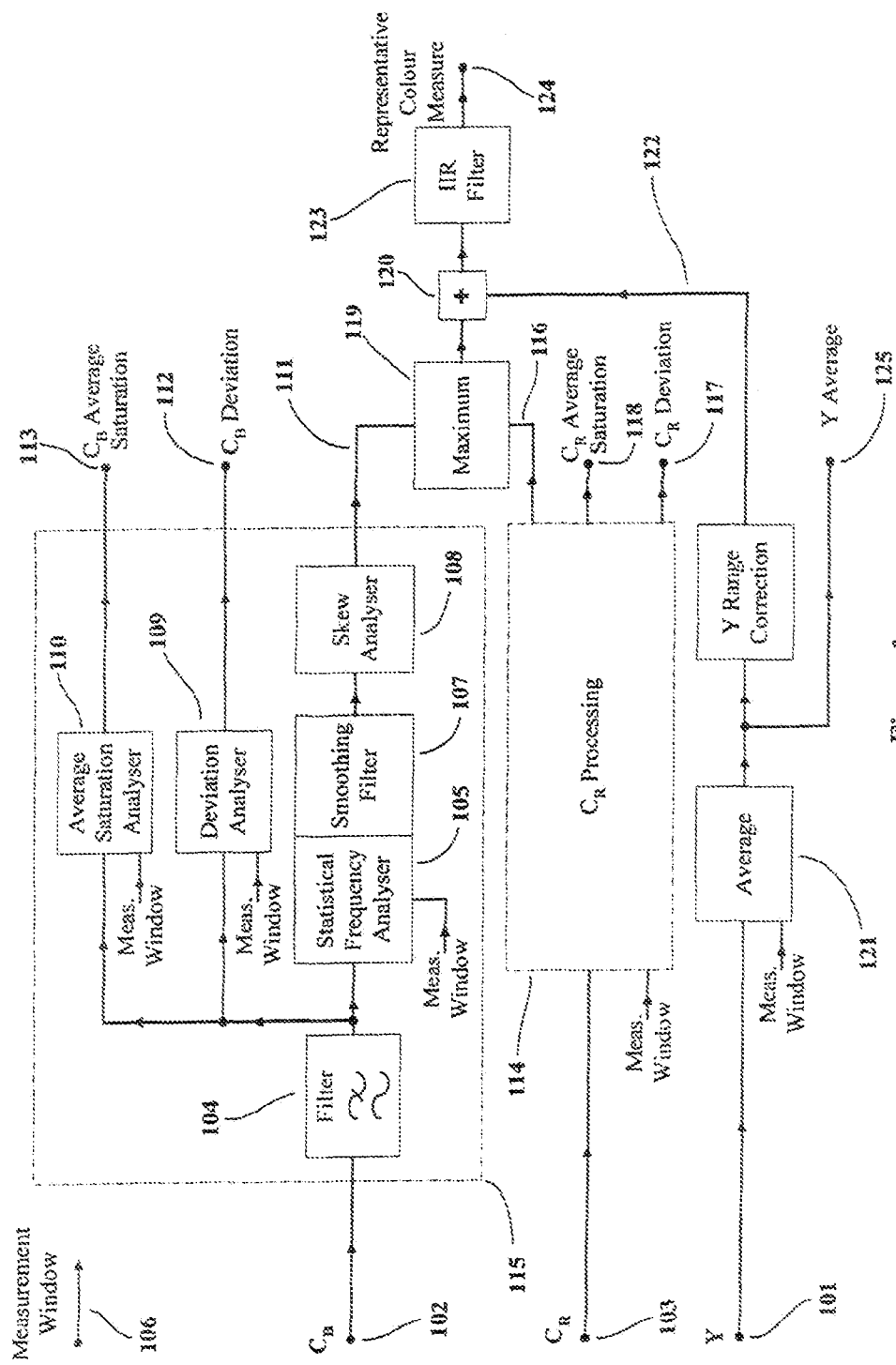
FIG. 1 shows a block diagram of an image analysis system according to an embodiment of the invention.

FIG. 1 shows an example of a system according to the invention for detecting representative colour information in image data. The image data needs to be in the form of luminance and colour difference values for pixels. If the image data is not in this form it can be converted to it by known methods including analogue to digital conversion, composite decoding, RGB to YUV or $YC_BC_R$ conversion, compression decoding etc.

In the system of FIG. 1 the image data is input as Luminance (Y) values (101), Blue colour difference ($C_B$) values (102) and Red colour difference ($C_R$) values (103) for pixels of the image. If necessary the image can be subsampled to reduce the number of pixel values. The illustrated system operates on parallel streams of Y $C_B$ and $C_R$ pixel values where the pixels follow each other according to a conventional television scanning raster. It will be apparent to the skilled person that the principle of the invention may be applied to the processing of single images, sets or sequences of related images; the image data may or may not be streamed, and could be in a computer file for example; and, that the processing may be carried out faster or slower than the intended image display rate.

Referring to FIG. 1, the input $C_B$ pixel values (102) are input to a low-pass filter (104). For the analysis of standard definition television images sampled according to ITU-R Recommendation 601 a 16-sample moving-average filter is suitable. The filtered values are input to a statistical-frequency analyser (105) which counts the total number of pixels having each of the possible values; i.e. it computes a statistical histogram showing the statistical-frequency distribution of the sample values. For television images it will usually be convenient to work with eight-bit data values and the histogram will comprise a set of 256 sample value frequencies. If the input pixel values are represented with more bits per word it may be necessary to round or truncate the sample values to a lesser number of bits to simplify the implementation.

For interlaced television it will usually be convenient to compute the histogram for the active picture area of each field. Alternatively a smaller analysis window within the active picture of each field may be analysed if other parts of the field are considered unimportant. The analysis window is defined by a measurement window control input (106) which identifies the pixels to be included in each statistical-frequency computation.

The shape of the histogram is smoothed in a filtration process (107) in which each constituent frequency value of the filtered histogram is calculated by taking a weighted sum of a range of frequency values from the unfiltered histogram. For example:

If the unfiltered histogram is: H(x)
Where the index x denotes pixel value;
The filtered histogram is given by:

$$H'(x)=[H(x-3)+2H(x-2)+3H(x-1)+4H(x)+3H(x+1)+2H(x+2)+H(x+3)]\div16$$

The smoothed histogram is analysed by a skew analyser (108), having a skew parameter output (111).

The skew analyser (108) determines the degree of asymmetry of the smoothed histogram. A suitable method of analysis is to calculate the lower quartile value, median value and upper quartile value of the pixel frequency values. This is done by summing the frequencies of ranges consecutive pixel values and comparing the result with the sum of all the frequencies.

The lower quartile value (sometimes called the lower 25 percentile) is the lowest pixel value whose frequency, when added to the frequencies of all lower value pixels, gives a value higher than one quarter of the total of all the frequencies.

The median value (sometimes called the 50 percentile) is the lowest pixel value whose frequency, when added to the frequencies of all lower value pixels, gives a value higher than one half of the total of all the frequencies.

The upper quartile value (sometimes called the upper 25 percentile, or the 75 percentile) is the lowest pixel value whose frequency, when added to the frequencies of all lower value pixels, gives a value higher than three quarters of the total of all the frequencies.

A convenient skew parameter is given by doubling the median, subtracting the upper and lower quartiles from it, and taking the absolute magnitude of the result. In FIG. 1 this skew parameter is the output (111) of the skew analyser (108).

It is preferable for the two quartiles and the median value to be calculated with fractional precision. This can be done by assuming that the shape of the frequency distribution follows a straight line between the points defined by the histogram and calculating where the distribution would intersect the relevant total value. The skew parameter (111) derived from these non-integral values will therefore also not necessarily be an integer.

The filtered pixels values at the output of the filter (104) are also passed to a deviation analyser (109), having a deviation parameter output (112); and, an average saturation analyser (110), having an average saturation output (113). The functions of these deviation and average analysers will be explained later.

The input $C_R$ pixel values (103) are processed in a $C_R$ processing block (114), which has functions identical to those included in the illustrated block (115), and outputs: a skew parameter (116); a deviation parameter (117); and, an average saturation parameter (118).

The greater of the skew values (111) and (116) is selected by a maximum selector (119) and input to an adder (120). This adder input gives a measure of the extent to which the pixel colour difference data is skewed, and it has been found that this measure can be used to distinguish images in which the colour information is representative of the object depicted in the image.

However, in the case of very bright or very dark images the spread of colour difference values will be narrow and the sensitivity of the skew measurement is reduced. In order to compensate for this, the luminance pixel values (101) are averaged over the measurement window in an averager (121) and the average value is used to calculate a luminance range correction parameter (122) which forms the second input to the adder (120).

A suitable value for the luminance range correction parameter (122) is obtained by evaluating the amount by which the average luminance value is less than a lower threshold value or the amount by which the average luminance value exceeds an upper threshold value. (No correction is applied if the average luminance lies between these threshold values.) For a system in which black is represented by the luminance value 16 and white is represented by 235, suitable lower and upper threshold values are 45 and 194 respectively.

The output of the adder (120) thus comprises a measure of representative colour values in the image data. It may be made more reliable by combining the results from more than one related image in a recursive filter. This is shown in FIG. 1 by the IIR filter (123) which gives an output representative colour measure (124). A suitable filter algorithm is:

$$\text{Output}_{(n)}=\frac{1}{4}[3\times\text{Output}_{(n-1)}+\text{Input}_{(n)}]$$

Where:
$\text{Output}_{(n)}$ is the current filter output;
$\text{Output}_{(n-1)}$ is the previous filter output; and,
$\text{Input}_{(n)}$ is the current filter input.

The output (124) may be compared with a threshold to determine whether the image contains representative colour information. However, a better result can be obtained in some circumstances by making use of information about the average colour saturation values and the spread of the colour difference values. Also, for sequences of images, it may be convenient to ignore measurements from some images in the sequence. These improvements are shown in the system of FIG. 2.

Figure 2:
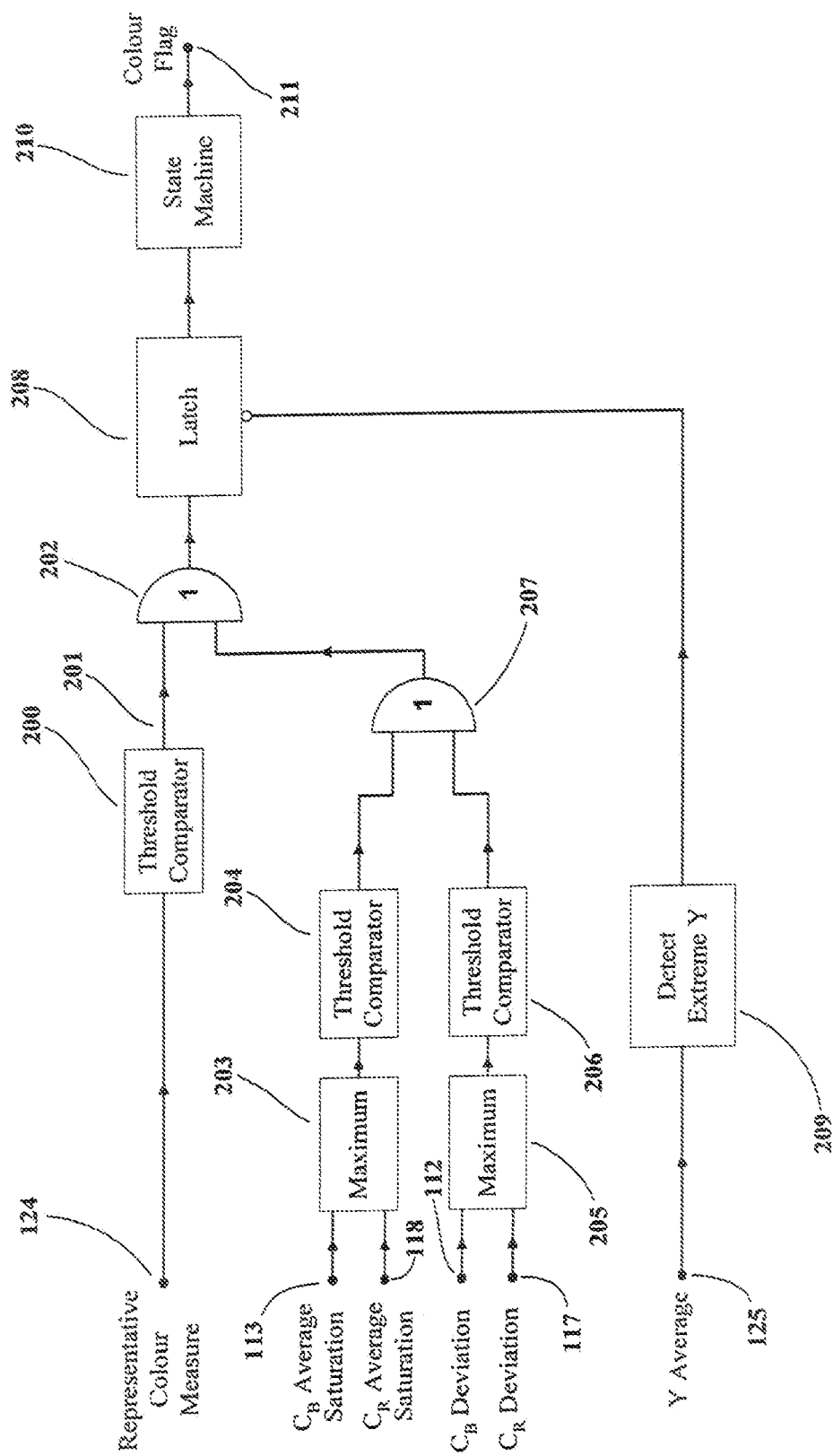
FIG. 2 shows a block diagram of a colour flag detector making use of the outputs from the system of FIG. 1.

FIG. 2 shows how the output (124) from the system of FIG. 1 can be improved if it is known that large plain areas of saturated colour are to be detected as representative colour.

Referring to FIG. 2 the output representative colour measure (124) from FIG. 1 is input to a threshold comparator (200) which produces a colour flag (201) which is active when the representative colour measure (124) is greater than a threshold. A suitable threshold value can be determined by experiment; the value 42 has been found appropriate for eight-bit television images. The flag is modified in an OR-gate (202) according to average saturation and colour difference spread information.

The $C_B$ average saturation analyser (110) shown in FIG. 1 computes the average $C_B$ value for all the pixels in the measurement window and outputs the magnitude of the difference between this average value and the value which represents zero colour difference (typically 128 in eight-bit systems) at the terminal (113). An identical process in the block (114) produces the equivalent for the $C_R$ values at the terminal (118). The greater of the values at terminals (113) and (118) is determined by a maximum function (203) in FIG. 2 and input to a threshold comparator (204) which gives an output when a threshold is exceeded. The output from the comparator (204) therefore indicates whether there is significant saturated colour in the pixels within the measurement window.

The deviation analyser (109) of FIG. 1 compares the $C_B$ value of each pixel within the measurement window with the average $C_B$ value over the measurement window and accumulates the magnitudes of the differences. (In order to simplify the implementation it may be convenient to use an average $C_B$ value from a previous measurement.) The accumulated sum is divided by the number of pixels in the measurement window and output at terminal (112) as a $C_B$ colour deviation parameter. An identical process in the block (114) produces the equivalent for the $C_R$ values at the terminal (117). The greater of the values at terminals (112) and (117) is determined by a maximum function (205) in FIG. 2 and input to a threshold comparator (206) which gives an output when a threshold is exceeded. The output of the comparator (206) therefore indicates when there is a significant range of different colours in the pixels within the measurement window.

The outputs of the comparators (204) and (206) are combined in an OR-gate (207) whose output is inactive unless either high saturation or high colour range is present in the image. If this is so, the colour flag (201) is forced into its active state by the OR-gate (202).

The modified colour flag is input to a latch (208) which is controlled according to the output (125) from the luminance average block (121) of FIG. 1. An extreme luminance value detector (209) detects when the average luminance value is very close to black or white, for example less than 32 or greater than 210 in a system where black is represented by 16 and white is represented by 235. If such extreme values are detected the latch (208) is disenabled so that its output is held at the value for the previously analysed measurement window. However, if the average luminance is closer to grey the output of the latch (208) is equal to the output of the OR-gate (202).

The colour flag at the output of the latch (208) can be made even more robust by a state-machine (210) which combines the results of several measurements and only allows its output colour flag (211) to change state if a defined number of changed input measurements from the latch (208) have been received. Depending on the application, it may be appropriate to have different criteria depending on the current state of the output (211).

The invention has been described by example and many variants are possible within the concept which has been described. For example other methods of determining the skew of the distributions of colour difference values may be used, such as evaluating a statistical moment of the distribution; and, there are known methods of determining the skew of a data distribution without first computing a histogram of the data. The example described is particularly applicable to sequences of images such as video fields or film frames. The invention is equally applicable to individual images.

The invention is not limited to images described by three parameters and colour difference signals other than the well-known $C_B$ and $C_R$ signals can be analysed for statistical asymmetry. For examples differences between one or more pairs of primary colour component signals can be analysed, or differences between individual primary colour components and combinations of primary components other than luminance can be analysed.

What is claimed is:

1. A method of detecting representative colour content in an image, the method comprising:
    establishing a set of colour difference values of pixels derived from the said image;
    deriving a skew parameter of the statistical distribution of said set of values; and
    determining the presence of representative colour by analysing the skew parameter.

2. A method according to claim 1 where the skew parameter is derived from an upper percentile, a lower percentile and a median value of the statistical distribution of colour difference values of the said pixels and representative colour is detected when the said skew parameter exceeds a threshold.

3. A method according to claim 1 where results from the analysis of more than one colour difference value from each pixel are analysed.

4. A method according to claim 1 where at least two related images are analysed and analysis results from separate images are used to derive a single detection result.

5. A method according to claim 1 where the set of colour difference values correspond to pixels from a defined region within the image.

6. A method according to claim 1 where the distribution of spatially filtered colour difference values of pixels is analysed.

7. A method according to claim 1 comprising the step of deriving a histogram of the statistical frequency distribution of colour difference values.

8. A method according to claim 7 where the histogram is smoothed prior to analysis.

9. A method according to claim 1 where the detection result depends upon an average luminance level.

10. A method according to claim 8 where a detection result is discarded if an extreme average luminance value is detected.

11. A method according to claim 1 where the detection result is modified if a high proportion of the colour difference values analysed correspond to high colour saturation.

12. A method according to claim 1 where the detection result is modified if a high proportion of widely separated colour difference values occur in the analysed colour difference values.

13. A non-transitory computer readable storage medium storing therein computer-readable instructions for implementing the method of claim 1.

14. Apparatus for detecting representative colour content in an image, the apparatus comprising:
    a statistical distribution analyser for generating a statistical distribution of a set of colour difference values of pixels derived from the said image; and
    a skew analyser for analysing the skew of said statistical distribution, deriving a skew parameter of the statistical distribution of said set of values, and providing the skew parameter to be analyzed for determining the presence of representative colour.

15. Apparatus as claimed in claim 14 comprising a threshold comparator for comparing a skew parameter derived from said statistical distribution with a threshold wherein representative colour is detected when the skew parameter exceeds a threshold.

16. Apparatus as claimed in claim 14 comprising a statistical distribution analyser for generating a second statistical distribution of a second colour difference value of pixels derived from the said image; and a skew analyser for analysing the skew of said second statistical distribution.

17. Apparatus according to claim 14 comprising a filter generating a detection result dependent on the analysis results from at least two related images.

18. Apparatus according to claim 14 having a measurement window selector for selecting a defined region within an image to be analysed.

19. Apparatus according to claim 14, further comprising a filter for spatially filtering colour difference values of pixels.

20. Apparatus according to claim 14 wherein the statistical distribution analyser comprises a statistical frequency analyser for deriving a histogram of the statistical frequency distribution of colour difference values; and a filter for smoothing the histogram prior to analysis.

21. Apparatus according to claim 14 comprising a luminance averager where the detection result depends upon an average luminance level.

22. Apparatus according to claim 14 comprising an extreme luminance value detector where a detection result is discarded if an extreme average luminance value is detected.

23. Apparatus according to claim 14 comprising a colour saturation analyser wherein the detection result is modified if a high proportion of the colour difference values analysed correspond to high colour saturation.

24. Apparatus according to claim 14 comprising colour difference deviation analyser, wherein the detection result is modified if a high proportion of widely separated colour difference values occur in the analysed colour difference values.

* * * * *

UNITED STATES PATENT AND TRADEMARK OFFICE
CERTIFICATE OF CORRECTION

| | | |
|---|---|---|
| PATENT NO. | : 7,945,090 B2 | Page 1 of 1 |
| APPLICATION NO. | : 11/738188 | |
| DATED | : May 17, 2011 | |
| INVENTOR(S) | : Jonathan Diggins | |

It is certified that error appears in the above-identified patent and that said Letters Patent is hereby corrected as shown below:

On the title page, col. 2, under FOREIGN PATENT DOCUMENTS, line 2 delete "0 441 358" and insert -- 0 441 558 --.

Signed and Sealed this
Fourth Day of October, 2011

David J. Kappos
*Director of the United States Patent and Trademark Office*